US007063338B2

(12) United States Patent
Alveteg et al.

(10) Patent No.: US 7,063,338 B2
(45) Date of Patent: Jun. 20, 2006

(54) TRUCK WITH SUPPORT LEGS

(75) Inventors: Magnus Alveteg, Borensberg (SE); Mikael Svensson, Borensberg (SE); Rolf Carlund, Vadstena (SE)

(73) Assignee: BT Industries (SE)

( * ) Notice: Subject to any disclaimer, the term of this patent is extended or adjusted under 35 U.S.C. 154(b) by 20 days.

(21) Appl. No.: 10/453,024

(22) Filed: Jun. 3, 2003

(65) Prior Publication Data

US 2003/0227147 A1 Dec. 11, 2003

(30) Foreign Application Priority Data

Jun. 5, 2002 (SE) .................................... 0201711

(51) Int. Cl.
*B62D 21/14* (2006.01)

(52) U.S. Cl. ............................... 280/43.12; 280/47.34; 414/495

(58) Field of Classification Search ............. 280/79.11, 280/43, 47.34, 47.371, 47.12, 651; 414/785, 414/634, 631, 661, 668; 187/229, 222, 228, 187/231, 224, 233, 234
See application file for complete search history.

(56) References Cited

U.S. PATENT DOCUMENTS 2,818,189 A * 12/1957 Schreck ...................... 414/661
2,855,119 A * 10/1958 Arnot ......................... 414/634
3,378,159 A * 4/1968 Trusock ....................... 414/634
3,640,415 A * 2/1972 Wahl et al. ................. 414/634
3,836,031 A * 9/1974 Weisker et al. ............. 414/668
3,850,111 A * 11/1974 Hansen ....................... 280/755
4,128,183 A * 12/1978 Finlayson ................... 187/222
4,205,938 A * 6/1980 Olson .......................... 414/661
4,300,867 A * 11/1981 Frees .......................... 414/661
5,411,361 A * 5/1995 Neri et al. .................. 414/668
5,462,136 A * 10/1995 Schoenmaker et al. ..... 187/223
5,622,469 A * 4/1997 Weber ........................ 414/785
5,918,703 A * 7/1999 Nordstrom .................. 187/231
6,742,790 B1 * 6/2004 Seagraves et al. ....... 280/47.34

FOREIGN PATENT DOCUMENTS

| | | |
|---|---|---|
| DE | 100 19 467 | 4/2000 |
| GB | 985350 | 2/1963 |
| GB | 2 043 028 | 12/1979 |
| GB | 2 110 620 | 11/1982 |

* cited by examiner

*Primary Examiner*—Hau Phan
(74) *Attorney, Agent, or Firm*—Hayes Soloway P.C.

(57) ABSTRACT

Narrow aisle truck that on each side includes two forward extending support legs, which each leg is provided with two support wheels. The two outer support wheels are displaced somewhat to the rear in relation to the inner support wheels, and, in the corner space outside the inner support wheels in front of the outer support wheels, lateral guide wheels are arranged.

5 Claims, 1 Drawing Sheet

TRUCK WITH SUPPORT LEGS

TECHNICAL FIELD

The present invention is generally related to narrow aisle trucks and, more particularly, is concerned with achieving increased stability of narrow aisle truck by arranging the support leg wheels.

BACKGROUND OF THE INVENTION

Warehouse and store aisles must be as narrow as possible to provide the maximum storage capacity. Narrow aisle trucks are used to stack goods in warehouses and stores. Trucks of this kind move essentially back and forth in narrow aisles that are only marginally wider than the truck.

In order to reduce or rather eliminate the risk that the truck bump into the racks along the aisles the support legs are in their front ends provided with lateral guiding wheels on the side of the support legs intended to fend off against rails arranged along the floor. However, racks and trucks are getting increasingly taller. Thus, a need exists in the industry for increasing the stability of the narrow aisle trucks.

SUMMARY OF THE INVENTION

The object of the present invention is to provide a narrow aisle truck with increased stability. In accordance with the present invention an improved stability of the truck is achieved by arranging two support wheels in each front end of the support legs, with the outer of these displaced somewhat to the rear so that the laterally guiding wheels can be placed in front of the outer support wheels and outside the inner support wheels on each support leg.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
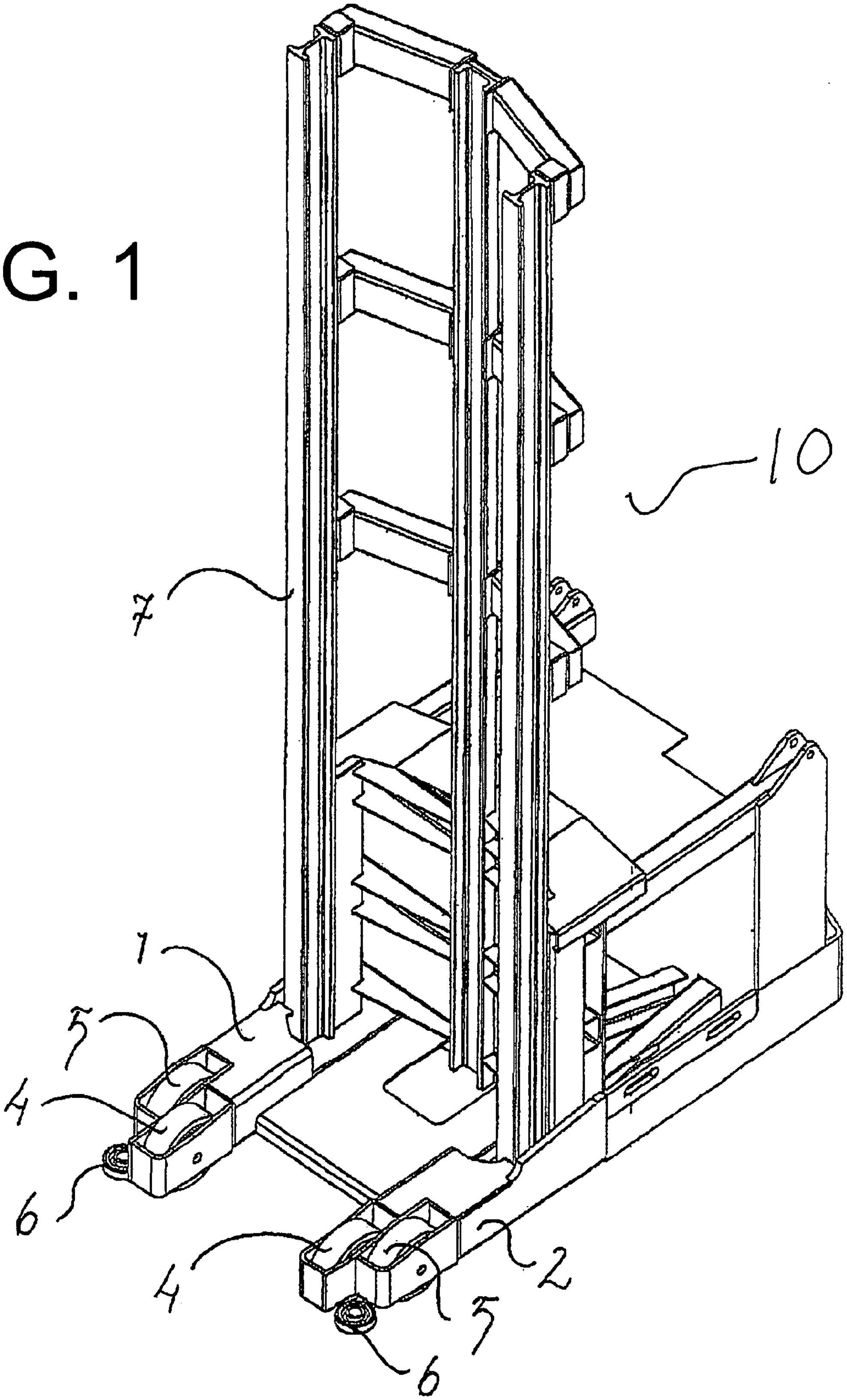
FIG. 1 is a perspective view of the first embodiment of the present invention.

FIG. 1 shows a first embodiment 10 of the present invention. The narrow aisle truck 10 includes two support legs 1 and 2, with front support wheel 4 and a rear support wheel 5 on the outer ends of the legs. The support wheels are displaced lengthwise so that the inner support wheel 4 is located closer to the front and the outer support wheels 5 behind the inner support wheel 4. In the space outside of the inner support wheels 4 and in front of the outer support wheels 5 (that is the front corners of the truck) lateral guide wheels 6 are arranged so that they protrude somewhat outside the frame lengthwise as well as laterally for contact with rails in the warehouse or store and to guide the lateral motion of the truck. The lateral guide wheels are journeyed on vertical axles fastened in the two support legs (not shown for reasons of clarity).

A narrow aisles truck also includes a high structure in several parts (of which only the lowermost is shown), and a liftable drivers cage in this (not shown), that is a truck with a very high center of gravity, which means that the stability has a very large influence on maximum load, maximum speed and maximum retardation and acceleration.

Since the outer wheels at the same time can be located as far out as the aisle allows, maximum stability against lateral tilting movements is achieved at the same time. This is extremely important because a millimeter movement of the support legs will be subjected the operator in the liftable drivers cage to a swing of several centimeters.

Possible lateral tilting movements normally do not occur exactly laterally but perpendicular to a line through the outermost support points on the tilting side, that is a line through the outer contact point of the outer support wheel and the contact point of the rear steering and driving wheel if the truck only has one rear wheel. If the truck is equipped with two closely or spaced mounted driving and steering wheels the tilting line passes through the contact area of the wheel located on the side towards which tilting takes place. Irrespective of the number of wheels or their width or track width, the widening of the front-end result in an outward displacement of the tilting line. That is, the distance of the center of gravity increase in the horizontal plane, which causes an increase in stability. Since the track width when a wheel or several rear wheels are used is essentially less than the track width of the outer wheels of the support legs, the displacement of the outer support leg wheels to rearward contributes to a displacement of the tilting line out from the center of gravity, and thus further increased stability. In this way, the risk of lateral tilting of the truck is reduced, when for instance the truck is moved between different narrow aisles.

With the present invention's arrangement of the support wheels and the laterally guiding wheels, the stability of the truck is improved in several ways. The support wheels may be placed as wide as the aisle allows without interfering with the lateral guide wheels. The lateral guide wheels do not infringe on the wheelbase of the truck or increase the wheelbase's length. In other words, the lateral guide wheel on each side is accommodated without restricting the total wheelbase or the track width of the outer wheels. At the same time the lateral guide wheels are arranged in the front end of the truck, where they also function best, protruding a small measure forward as well as well as laterally. Since the inner wheels are located as, far forward as the construction allows maximum stability against a tilting forward is achieved.

With the wheel arrangement according to the invention, an increased stability is not only achieved but also the relative position of the support wheels increases each support leg contact with the ground. Having this increased contact means that one of the two wheels on each support leg will be in contact against the ground when the other wheel pass over a joint on the floor, which is one of the places when most stability problems occur. In this way, the lengthwise oscillation tendencies of the truck are reduced during movement. Furthermore, a quieter and smoother run is obtained when the truck passes over joints. This smoother run reduces the strains in the truck and reduces the discomfort of the driver who may be high up.

The wheel device in accordance with the present invention can also be used for other trucks than the one described above for narrow aisles, as for instance mid-steered trucks where an essentially improved stability is obtained. Furthermore, the present invention can also be used with any displaced support leg wheel device to improve stability.

The invention claimed is:

1. A narrow aisle truck comprising:

a main structure on a floor;

a plurality of forward support legs extending out of said main structure, each of said forward support legs having a distal end with respect to said main structure; and inner and outer support wheels in contact with the floor, said inner and outer support wheels being disposed near the distal end of each of said forward support legs, wherein said inner support wheels are mounted closer to the distal end of said forward support legs than said outer support wheels, said truck further comprising a lateral guide wheel disposed on each of said forward support legs adjacent to and orthogonal to said inner and outer support wheels.

2. The narrow aisle truck as claimed in claim 1, wherein said lateral guide wheels are rotably mounted on a vertical axis in a space outside of the inner support wheels in front of the outer support wheels.

3. The narrow aisle truck as claimed in claim 2, wherein the guide rollers are below the top level of the support wheels.

4. The narrow aisle truck as claimed in claim 3, wherein the space is quadratic in shape.

5. The narrow aisle truck as claimed in claim 1, wherein the support wheels overlap with one another.

* * * * *